United States Patent
Jette

(10) Patent No.: US 10,666,029 B2
(45) Date of Patent: May 26, 2020

(54) CABLE MANAGEMENT SYSTEM AND METHOD FOR PHOTOVOLTAIC SYSTEMS AND OTHER CABLE-DEPENDENT SYSTEMS

(71) Applicant: Cable Management Solutions Inc., Bayshore, NY (US)

(72) Inventor: Roger Jette, West Islip, NY (US)

(73) Assignee: Cable Management Solutions Inc., Bayshore, NY (US)

( * ) Notice: Subject to any disclaimer, the term of this patent is extended or adjusted under 35 U.S.C. 154(b) by 0 days.

(21) Appl. No.: 15/877,883

(22) Filed: Jan. 23, 2018

(65) Prior Publication Data

US 2019/0229507 A1 Jul. 25, 2019

(51) Int. Cl.
*H02G 3/04* (2006.01)
*H02G 3/32* (2006.01)

(52) U.S. Cl.
CPC .......... *H02G 3/0437* (2013.01); *H02G 3/32* (2013.01); *H02G 3/0456* (2013.01)

(58) Field of Classification Search
None
See application file for complete search history.

(56) References Cited

U.S. PATENT DOCUMENTS

| 4,419,535 | A | * | 12/1983 | O'Hara | H02G 3/22 169/48 |
| 5,992,802 | A | * | 11/1999 | Campbell | H02G 3/30 248/68.1 |
| 7,345,241 | B2 | * | 3/2008 | Caveney | H01R 9/2416 174/135 |
| 7,952,027 | B2 | * | 5/2011 | Grelck | H02G 3/32 138/111 |
| 8,193,448 | B2 | * | 6/2012 | Syed | G06F 1/18 174/68.1 |
| 8,294,030 | B2 | * | 10/2012 | Pollard, Jr. | H02G 3/30 174/155 |
| 9,038,967 | B2 | * | 5/2015 | Struck | F16L 3/2235 248/68.1 |
| 10,141,731 | B2 | * | 11/2018 | Pawluk | H02G 3/0437 |

OTHER PUBLICATIONS

Snake Tray: "Solar-Max-Main", Nov. 9, 2017 (Nov. 9, 2017), XP055576542, retrieved from the Internet: URL: http://www.snaketray.com/product-catalog/utility-grade-solar-snake-tray/snake-max/solar-max-main/ [retrieved on Apr. 2, 2019], p. 2.
European Search Report dated Apr. 2, 2019, issued in EP Appln. No. 19151191.
Written Opinion dated in EP 19151191.

\* cited by examiner

*Primary Examiner* — Dimary S Lopez Cruz
(74) *Attorney, Agent, or Firm* — Carter, DeLuca & Farrell LLP

(57) ABSTRACT

A cable management system includes first and second beams spaced-apart from one another and extending in generally parallel orientation relative to one another. A plurality of brackets are supported by and extend between the first and second beams in stacked orientation relative to one another. The plurality of brackets is configured to retain a row of cables between each adjacent pair of stacked brackets. Each bracket of the plurality of brackets includes a plurality of cable receptacles. Opposing cable receptacles of each adjacent pair of stacked brackets are configured for inter-fit engagement with one another in offset, overlapping orientation to retain a cable of the rows of cables therebetween.

18 Claims, 6 Drawing Sheets

CABLE MANAGEMENT SYSTEM AND METHOD FOR PHOTOVOLTAIC SYSTEMS AND OTHER CABLE-DEPENDENT SYSTEMS

BACKGROUND

Technical Field

The present disclosure relates to cable management systems. More particularly, the present disclosure relates to a cable management system and method for use with photovoltaic systems and other cable-dependent systems.

Background of Related Art

Solar power has become increasingly popular in recent years as an alternative to finite energy sources such as oil and coal. In particular, commercial and residential property photovoltaic systems have become a viable, cost-effective option for business owners and homeowners. A typical photovoltaic system includes a plurality of solar modules that are positioned to form a solar array for converting sunlight into DC power. The photovoltaic system further includes various supporting components such as, for example, inverters, power-conditioning equipment, power-storage equipment, safety equipment, instrumentation, meters, etc., to enable the safe and efficient collection, conversion, storage, and/or transport of power.

Mounting components are also required for a typical photovoltaic system, in order to mount the solar array in an appropriate position to facilitate the collection of sunlight. In addition to such mounting components, it would be desirable to provide an easy-to-install, organized, space-efficient cable management system to facilitate the routing of cables to the various components of the photovoltaic system, for example, the solar modules, inverters, power-conditioning equipment, power-storage equipment, safety equipment, instrumentation, meters, etc.

SUMMARY

Provided in accordance with the present disclosure is an easy-to-install, organized, space-efficient cable management system and method that facilitate the routing of cables to various components of a system such as, for example, a photovoltaic system. However, the cable management system and method of the present disclosure are not limited to use in a photovoltaic system; rather, the cable management system and method of the present disclosure may be utilized in any suitable industry and/or for any suitable purpose. The above and other aspects and features of the present disclosure are detailed below. To the extent consistent, any of the aspects and features detailed herein may be utilized with any or all of the other aspects and features detailed herein.

In accordance with aspects of the present disclosure, a cable management system is provided including first and second beams spaced-apart from one another and extending in generally parallel orientation relative to one another, and a plurality of brackets supported by and extending between the first and second beams in stacked orientation relative to one another. The plurality of brackets is configured to retain a row of cables between each adjacent pair of stacked brackets. Each bracket of the plurality of brackets includes a plurality of cable receptacles. Opposing cable receptacles of each adjacent pair of stacked brackets are configured for inter-fit engagement with one another in offset, overlapping orientation to retain a cable of the rows of cables therebetween.

In an aspect of the present disclosure, the plurality of brackets includes a base bracket. The plurality of cable receptacles of the base bracket is disposed on an upwardly-facing side of the base bracket. In such aspects, the base bracket may define feet configured to slidably engage shelves of the first and second beams.

In another aspect of the present disclosure, the plurality of brackets includes at least one intermediate bracket. The plurality of cable receptacles of the at least one intermediate bracket is disposed on both upwardly-facing and downwardly-facing sides of the at least one intermediate bracket. In such aspects, each of the at least one intermediate brackets defines fingers configured to slidably engage shelves of the first and second beams.

In yet another aspect of the present disclosure, the plurality of brackets includes a cap bracket. The plurality of cable receptacles of the cap bracket is disposed on a downwardly-facing side of the cap bracket.

In still another aspect of the present disclosure, each cable receptacle includes a pair of sidewalls and defines a U-shaped opening between the sidewalls. In such aspects, the sidewalls may include flanges configured to resiliently retain a cable within each U-shaped opening.

In still yet another aspect of the present disclosure, a second plurality of brackets spaced-apart from the plurality of brackets along a length of the first and second beams may be provided. The second plurality of brackets are similar to and may include any of the features of the plurality of brackets.

Another cable management system provided in accordance with the present disclosure includes first and second beams spaced-apart from one another and extending in generally parallel orientation relative to one another, a base bracket, a plurality of intermediate brackets, and a cap bracket. The base bracket is supported by and extends between the first and second beams and includes a plurality of cable receptacles disposed on an upwardly-facing side of the base bracket. The plurality of intermediate brackets is supported by and extends between the first and second beams and each includes a plurality of cable receptacles disposed on upwardly-facing and downwardly-facing sides thereof. The cap bracket is supported by and extends between the first and second beams and includes a plurality of cable receptacles disposed on a downwardly-facing side of the cap bracket. The base bracket, the plurality of intermediate brackets, and the cap bracket are disposed in stacked relation relative to one another. Opposing cable receptacles of each adjacent pair of stacked brackets are configured for inter-fit engagement with one another in offset, overlapping orientation to retain a cable therebetween such that a row of cables is retained between each adjacent pair of stacked brackets.

In an aspect of the present disclosure, the base bracket defines feet configured to slidably engage shelves of the first and second beams.

In another aspect of the present disclosure, each of the plurality of intermediate brackets defines fingers configured to slidably engage shelves of the first and second beams.

In still another aspect of the present disclosure, each cable receptacle includes a pair of sidewalls and defines a U-shaped opening between the sidewalls.

In yet another aspect of the present disclosure, the sidewalls of the cable receptacles include flanges configured to resiliently retain a cable within each U-shaped opening.

In still yet another aspect of the present disclosure, the plurality of intermediate brackets includes a lower intermediate bracket configured to engage the base bracket and another intermediate bracket, at least one middle intermediate bracket configured to engage other intermediate brackets, and an upper intermediate bracket configured to engage another intermediate bracket and the cap bracket.

A method of installing a cable management system retaining a plurality of cables therein in accordance with the present disclosure includes positioning first and second beams in generally parallel, spaced-apart relation on at least one support structure, engaging the first and second beams to the at least one support structure, and alternatingly positioning brackets and a row of cables. The alternatingly positioning, more specifically, includes positioning a bracket such that the bracket is supported by and extends between the first and second beams, and positioning the row of cables such that each cable of the row of cables is engaged within one of the cable receptacles of the plurality of cable receptacles of the bracket. Opposing cable receptacles of each adjacent pair of brackets are inter-fittingly engaged with one another in offset, overlapping orientation to retain a cable therebetween such that a row of cables is retained between each adjacent pair of brackets.

In another aspect of the present disclosure, a first of the alternating positionings includes positioning a base bracket such that feet of the base bracket are slidably engaged between the first and second beams.

In yet another aspect of the present disclosure, positioning the base bracket includes translating the base bracket into position between the first and second beams and rotating the base bracket relative to the first and second beams.

In still another aspect of the present disclosure, a subsequent plurality of the alternating positionings includes positioning an intermediate bracket such that fingers of the intermediate bracket are slidably engaged between the first and second beams.

In another aspect of the present disclosure, after positioning a last row of cables, the method further includes positioning a cap bracket such that the cap bracket is supported by and extends between the first and second beams and such that a plurality of cable receptacles of the cap bracket engage cables of the last row of cables.

BRIEF DESCRIPTION OF THE DRAWINGS

Various aspects and features of the present disclosure are described hereinbelow with reference to the drawing figures, wherein.

DETAILED DESCRIPTION

Figure 1:
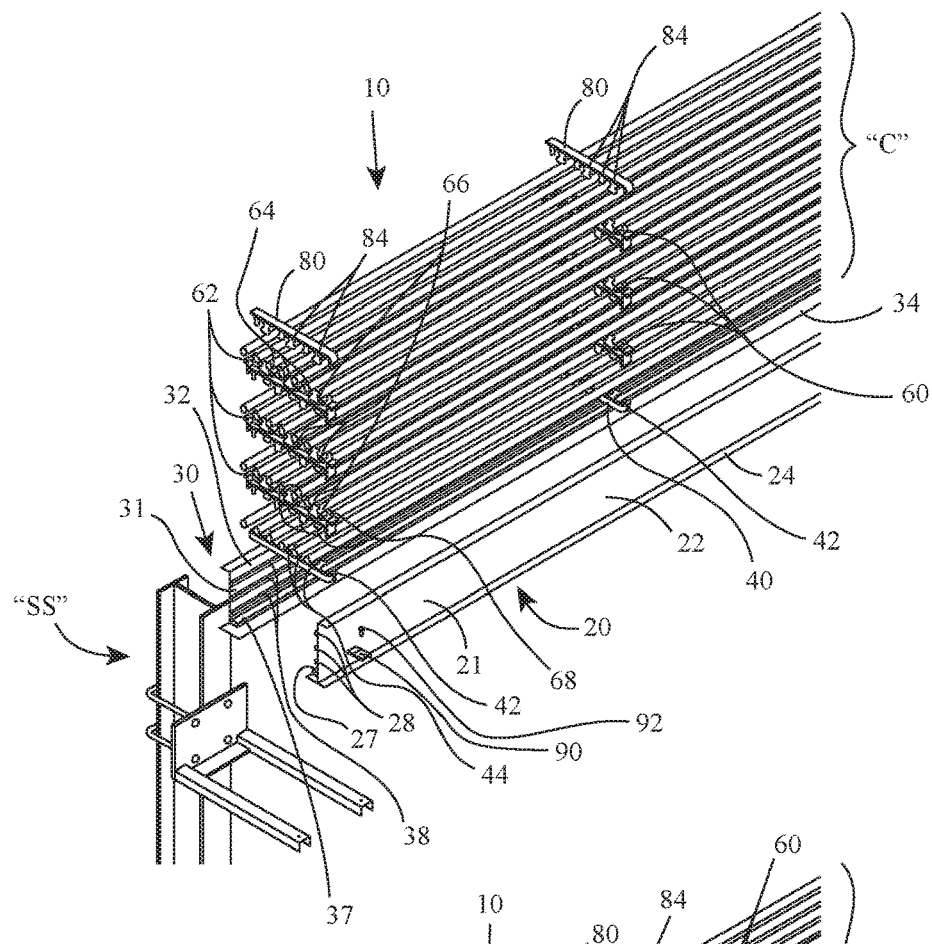
FIG. 1 is an exploded, perspective view of a portion of a cable management system provided in accordance with aspects of the present disclosure and configured for engagement with a support structure.
Figure 2:
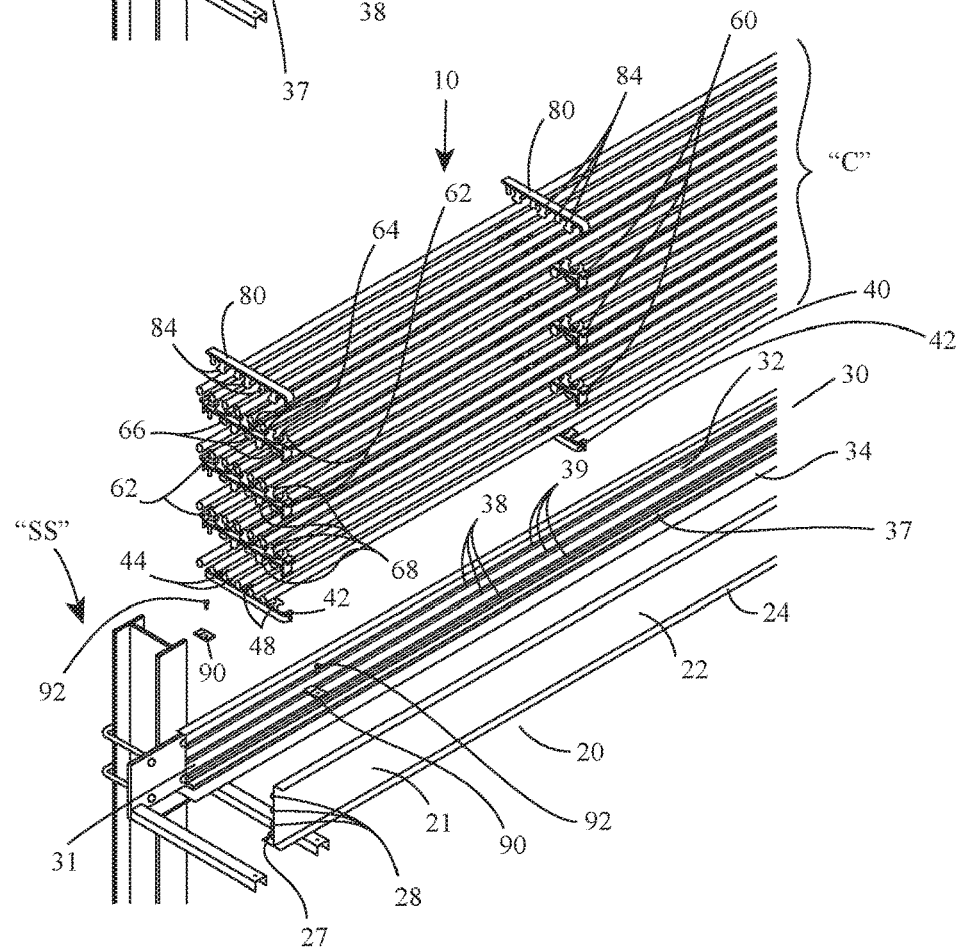
FIG. 2 is an exploded, perspective view of the portion of the cable management system of FIG. 1, wherein beams of the cable management system are positioned for engagement with the support structure.
Figure 3:
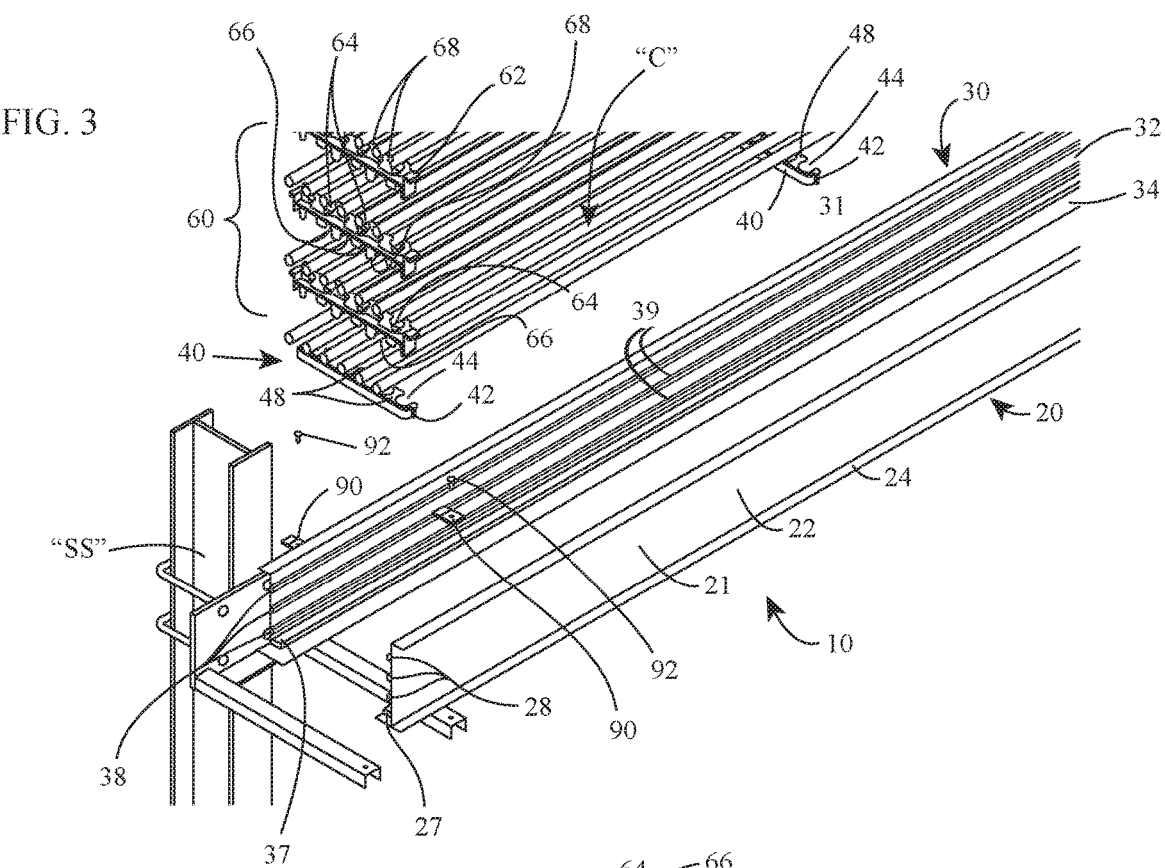
FIGS. 3-4 are enlarged, exploded, perspective views of the portion of the cable management system of FIG. 1, illustrating engagement of the beams of the cable management system with the support structure.
Figure 4:
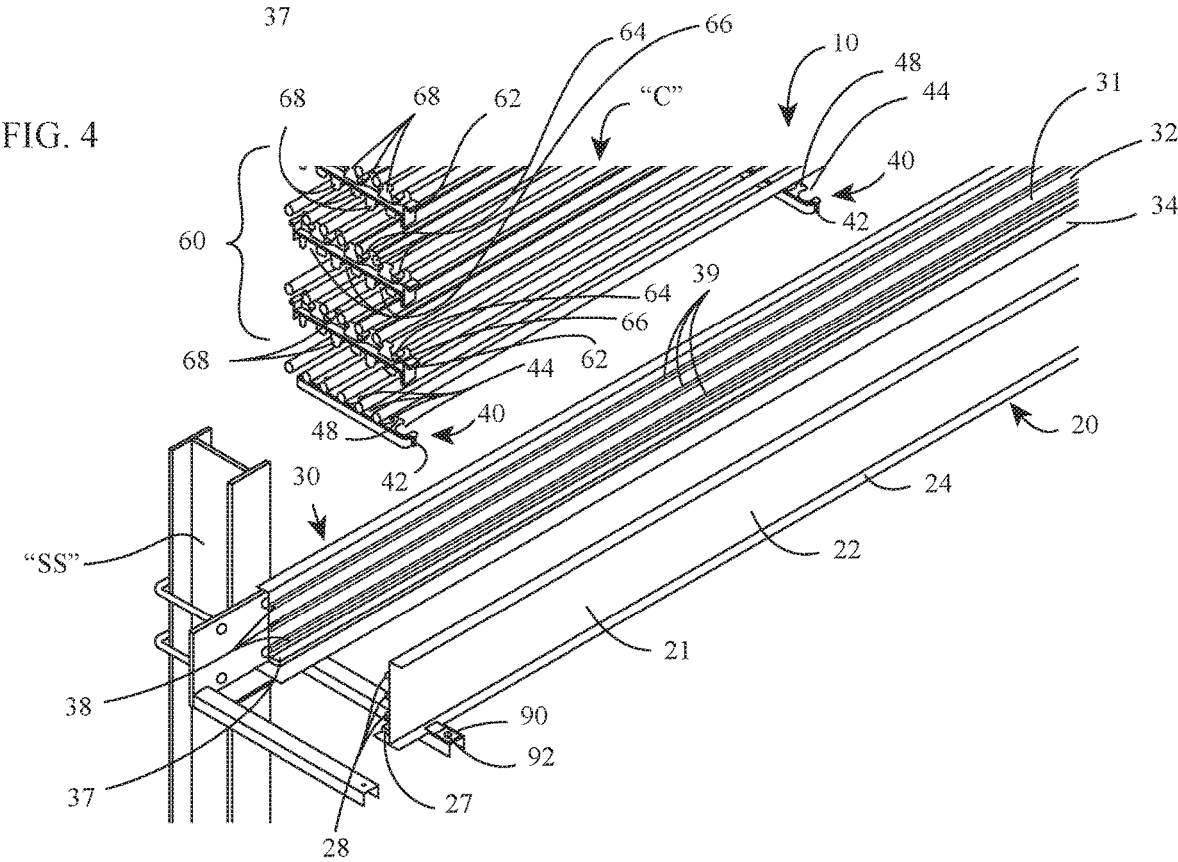
Figure 5A:
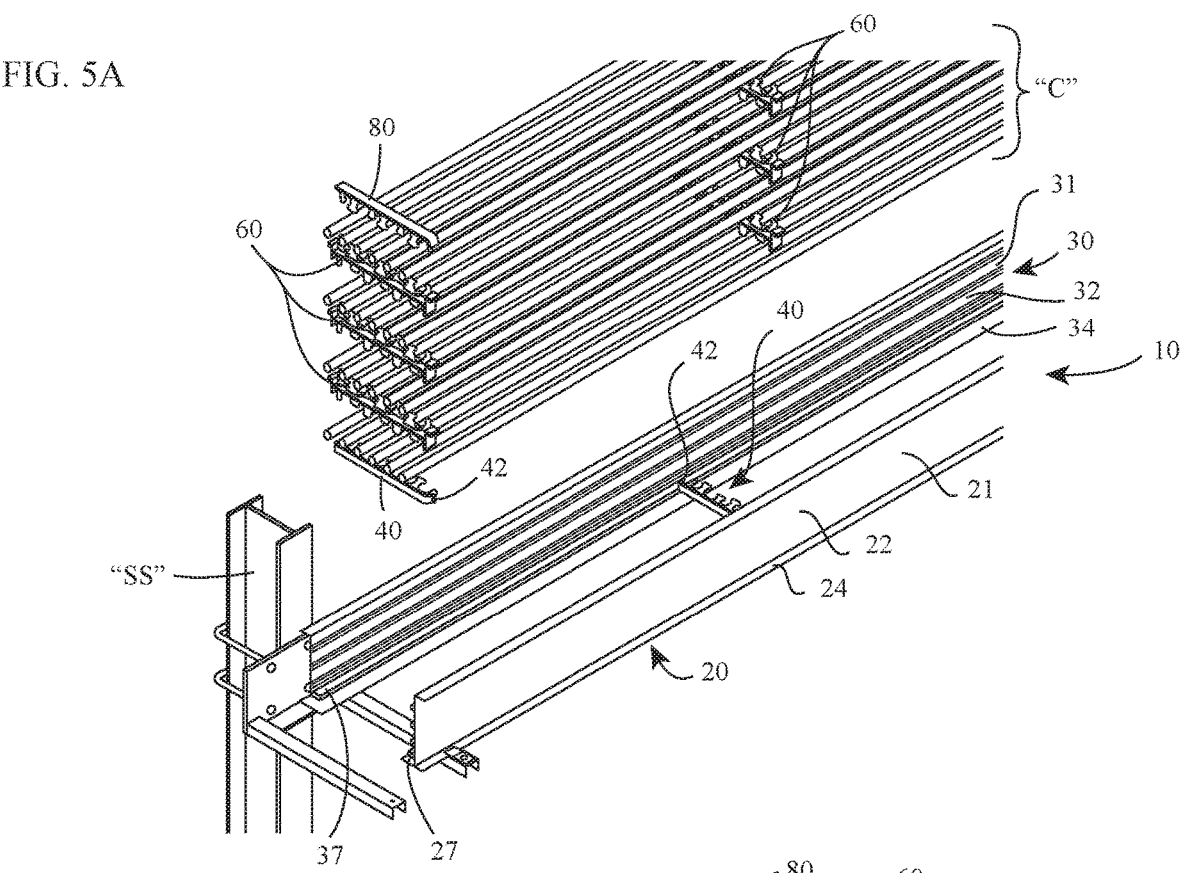
FIGS. 5A and 5B are exploded, perspective views of the portion of the cable management system of FIG. 1, illustrating positioning and engagement of a first base bracket with the beams of the cable management system.
Figure 5B:
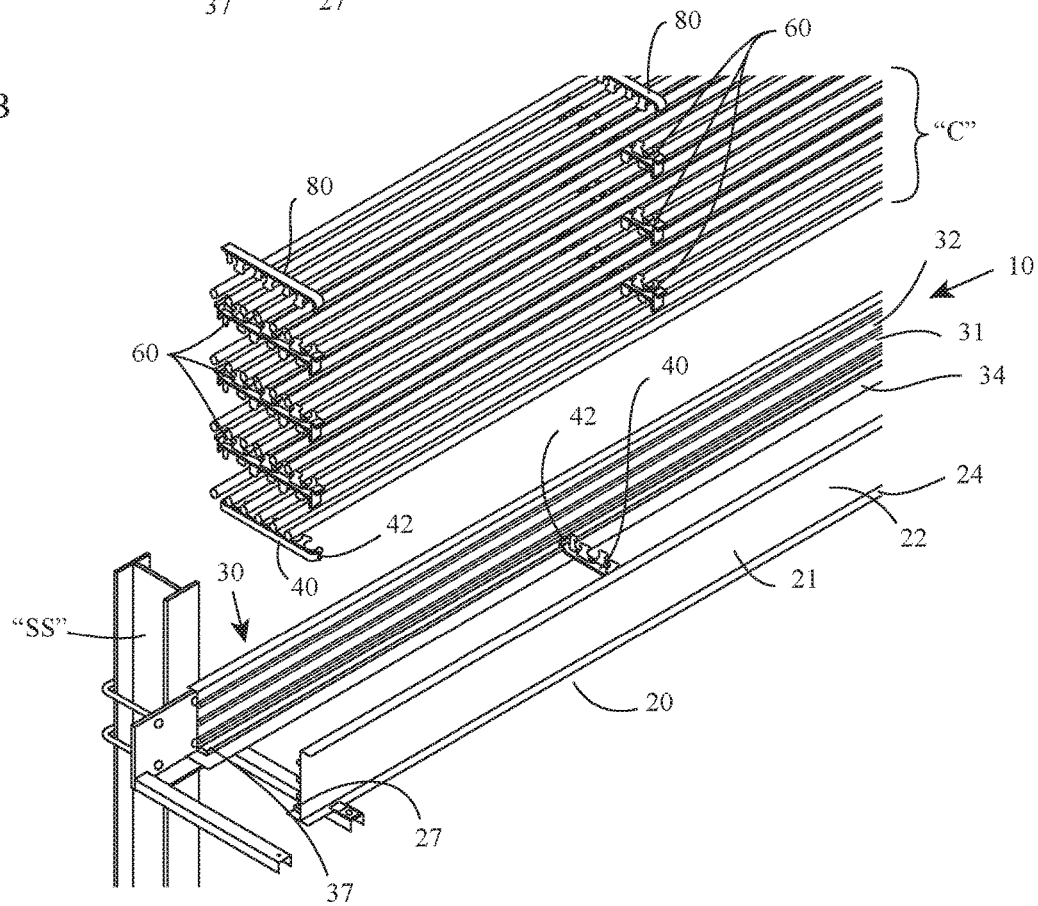
Figure 6A:
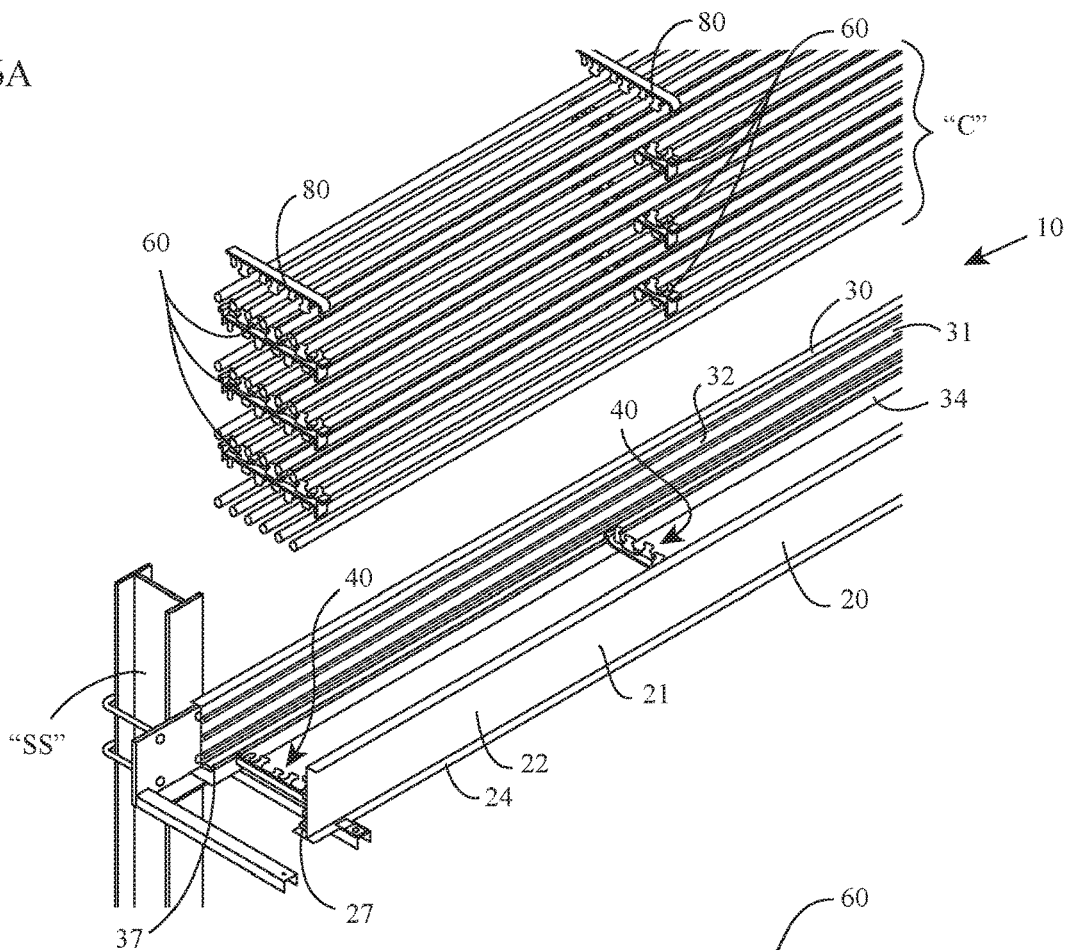
FIGS. 6A and 6B are exploded, perspective views of the portion of the cable management system of FIG. 1, illustrating positioning and engagement of a second base bracket with the beams of the cable management system.
Figure 6B:
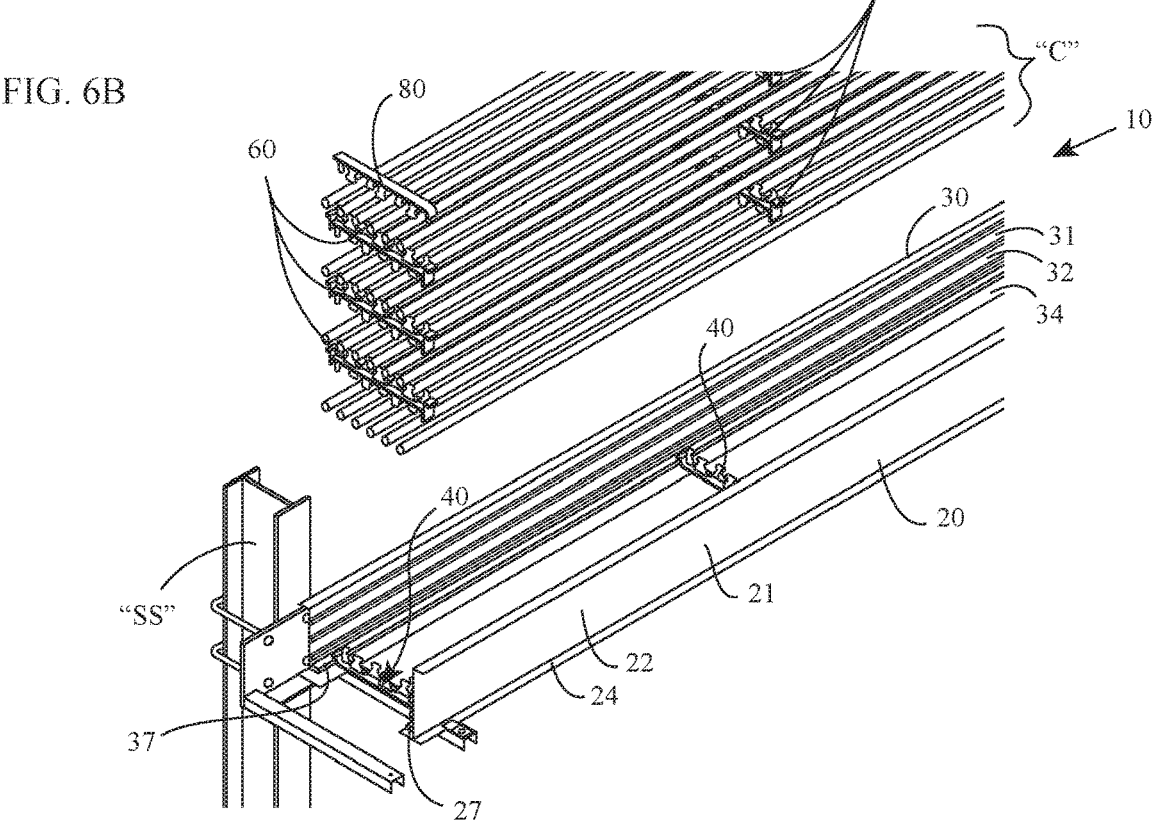

Referring generally to FIGS. 1-10, a cable management system provided in accordance with the present disclosure is shown generally identified by reference numeral 10. Cable management system 10 is an easy-to-install, organized, space-efficient cable management system that facilitates the routing of cables to various components of a system such as, for example, a photovoltaic system, although use with other suitable systems is also contemplated.

Cable management system 10 includes first and second spaced-apart beams 20, 30 configured for mounting on one or more support structures "SS," a plurality of base brackets 40 configured for engagement between the first and second beams 20, 30 and to extend transversely thereacross for supporting a plurality of rows of cables "C," a plurality of sets of intermediate brackets 60 configured for engagement between the first and second beams 20, 30 and to extend transversely thereacross and between each row of cables "C," and a plurality of cap brackets 80 configured for engagement between the first and second beams 20, 30 and to extend transversely thereacross for retaining the upper-most row of cables "C." Although only one end of cable management system 10, one support structure "SS" mounting cable management system 10 thereon, and two base brackets 40, two intermediate brackets 60 in each set of intermediate brackets 60, and two cap brackets 80 are illustrated in FIGS. 1-10, it is understood that cable management system 10 may be mounted on a plurality of support structure "SS," e.g., a support structure at either end thereof and, in some embodiment, via one or more intermediate support structures. Likewise, any suitable number of base, intermediate, and/or cap brackets 40, 60, 80 may be provided, depending upon, for example, the length of cable management system 10, the support requirements of cable management system 10, and/or other factors.

Continuing with general reference to FIGS. 1-10, beams 20, 30, as mentioned above, are spaced apart from one another and are disposed in generally (within assembly tolerances) parallel orientation relative to one another such that each beam defines an inwardly-facing side 31 (only inwardly-facing side 31 of beam 30 is shown; the inwardly-facing side of beam 20 is similar) and an outwardly-facing side 21 (only outwardly-facing side 21 of beam 20 is shown; the outwardly-facing side of beam 30 is similar). Each beam 20, 30 includes a vertical support 22, 32 and a base 24, 34. Vertical supports 22, 32 are oriented in generally (within manufacturing tolerances) perpendicular orientation relative to bases 24, 34, respectively. Bases 24, 34 extend from both the inwardly and outwardly-facing sides 21, 31 of vertical supports 22, 32 to define inwardly-extending flanges and outwardly-extending flanges. Beams 20, 30 may further include outward-extending cap flanges extending along the opposite edges of vertical supports 22, 32 as compared to bases 24, 34. That is, beams 20, 30 may define "I"-beam-like configurations, except that the inwardly-extending flange on the cap portions of beams 20, 30 are removed. However, other configurations are also contemplated.

Beams 20, 30 each include a base shelf 27, 37 disposed thereon, vertically-spaced from bases 24, 34, respectively, and extending along the inwardly-facing sides 31 of vertical supports 22, 32, respectively. Base shelves 27, 37 may be formed with vertical supports 22, 32 or may be secured thereto in any suitable manner, e.g., welding, mechanical fasteners, etc. Base shelves 27, 37 may extend continuously along the lengths of vertical supports 22, 32, or may be segmented such that a plurality of base shelf components of base shelves 27, 37 are spaced-apart along the lengths of vertical supports 22, 32. Base shelves 27, 37 are configured to receive or otherwise engage feet 42 of base brackets 40 facilitate engagement of base brackets 40 with beams 20, 30, as detailed below.

Beams 20, 30 each further include a plurality of intermediate shelves 28, 38 vertically-spaced apart from one another and from base shelves 27, 37 and extending along the inwardly-facing sides 31 of vertical supports 22, 32, respectively. Intermediate shelves 28, 38 may be formed with vertical supports 22, 32 or may be secured thereto in any suitable manner, e.g., welding, mechanical fasteners, etc. Intermediate shelves 28, 38 may extend continuously along the lengths of vertical supports 22, 32, or may be segmented such that a plurality of shelf components of intermediate shelves 28, 38 are spaced-apart along the lengths of vertical supports 22, 32. Intermediate shelves 28, 38 may further define channels 39 (only channels 39 of intermediate shelves 38 are shown; the channels of shelves 28 are similarly configured) therein and extending therealong adjacent vertical supports 22, 32. Channels 39 are configured to receive fingers 62 of intermediate brackets 60 to facilitate engagement of intermediate brackets 60 with beams 20, 30, as detailed below.

Referring still to FIGS. 1-10, as noted above, the plurality of base brackets 40 are configured for engagement between the first and second beams 20, 30 and to extend transversely thereacross for supporting a plurality of rows of cables "C." Each base bracket 40 includes a foot 42 at either end thereof and a plurality of cable receptacles 44 disposed between the ends of the base bracket 40 and extending along an upper side of base bracket 40.

Feet 42 of base brackets 40 are configured for engagement with base shelves 27, 37 of beams 20, 30. Feet 42, more specifically, may be configured for slidable engagement between base shelves 27, 37 and the inwardly-extending flanges of bases of beams 20, 30, for slidable engagement about base shelves 27, 37, or for engagement in any other suitable manner whereby translation of base brackets 40 along the lengths of beams 20, 30 is permitted but vertical movement of base brackets 40 relative to beams 20, 30 is inhibited. In order to enable such engagement, as detailed below, base brackets 40 may first be positioned in a rotated, installation orientation and then rotated 90 degrees into a use orientation, wherein base brackets 40 are slidably engaged with base shelves 27, 37 (see, e.g., FIGS. 5A-5B and 6A-6B).

Each cable receptacle 44 defines a generally U-shaped configuration for receiving a portion of a cable "C" therein and incudes a pair of sidewalls 48 including inwardly-extending flanges at the free ends thereof to resiliently retain cables "C" within cable receptacles 44. Although six (6) cable receptacles 44 are illustrated, it is contemplated that greater or fewer cable receptacles 44 may be provided for retaining greater or fewer amounts of cables "C."

Sidewalls 48 of cable receptacles 44 of base brackets 40 are alternatingly disposed towards the front-facing and rear-facing sides of each base bracket 40. As such, a plurality of voids are alternatingly defined towards the front-facing and rear-facing sides of each base bracket 40.

With continued reference to FIGS. 1-10, the plurality of sets of intermediate brackets 60, as noted above, are configured for engagement between the first and second beams 20, 30 and to extend transversely thereacross and between each row of cables "C." Each intermediate bracket 60, more specifically, includes a finger 62 at either end thereof and first and second pluralities of cable receptacles 64, 66 disposed between the ends of the intermediate brackets 60 and extending along the upper and lower sides of intermediate brackets 60, respectively. Each cable receptacle 64, 66 defines a generally U-shaped configuration (the cable receptacles 66 are inverted U-shaped) configured to receive a portion of a cable "C" and a pair of sidewalls 68 including inwardly-extending flanges at the free ends thereof to resiliently retain cables "C" within cable receptacles 64, 66. Although six (6) of each of cable receptacles 64, 66 are illustrated, it is contemplated that greater or fewer cable receptacles 64, 66 be provided for retaining greater or fewer amounts of cables "C."

Fingers 62 of intermediate brackets 60 are configured for receipt within channels 39 of intermediate shelves 28, 38 of beams 20, 30, to slidably engage intermediate brackets 60 with intermediate shelves 28, 38.

Sidewalls 68 of cable receptacles 64, 66 of intermediate brackets 60 are alternatingly disposed towards the front-facing and rear-facing sides of each intermediate bracket 60. As such, a plurality of voids are alternatingly defined towards the front-facing and rear-facing sides of each intermediate bracket 60. As a result of this configuration of sidewalls 68 and that of sidewalls 48 of base brackets 40, when an intermediate bracket 60 is positioned on a base bracket 40 with a row of cables "C" therebetween, or when an intermediate bracket 60 is placed on another intermediate bracket 60 with a row of cables "C" therebetween, the sidewalls 48, 68 are received within the opposed voids so as to provide an inter-fit between the brackets 40, 60 with the cable receptacles 44, 64, 66 engaging each cable "C" between the brackets 40, 60 and the offset, overlapping sidewalls 48, 68 laterally retaining the cables "C." Brackets 40, 60 may further include slots (not explicitly shown) or other features configured to enable snap-fit engagement of the sidewalls 48, 68 with the opposing bracket 40, 60 to thereby engage brackets 40, 60 with one another.

The plurality of cap brackets 80, as illustrated in FIGS. 1-10, and as noted above, are configured for engagement between the first and second beams 20, 30 and to extend transversely thereacross for retaining the upper-most row of cables "C." Each cap bracket 80 includes a plurality of cable receptacles 84 disposed between the ends of the cap bracket 80 and extending along a lower side of cap bracket 80. Cable receptacles 84 are configured similar to cable receptacles 66 of intermediate brackets 60 and function in a similar manner. Cap brackets 80 may likewise be configured to engage, e.g., in snap-fit relation, the opposing intermediate bracket 60.

Referring now to FIGS. 1-10, the installation of system 10 on a support structure "SS" for retaining a plurality of cables "C" is described. With initial reference to FIGS. 1-4, beams 20, 30 are positioned on the support structure "SS." Although only one end portion of system 10 is shown, it is understood that beams 20, 30 may be positioned on support structures "SS" at both ends thereof and, in some embodiments, at intermediate points therealong. Once beams 20, 30 are positioned on the support structure "SS," panels 90 and rivets 92 or other suitable engagement components are utilized to maintain beams 20, 30 in position on the support structure "SS." More specifically, Panels 90 are disposed in overlapping relation with the outwardly-extending flanges of bases 24, 34 of beams 20, 30 and are secured to the support structure "SS" via rivets 92.

Referring to FIGS. 5A-5B and 6A-6B, once beams 20, 30 are engaged on the support structure "SS," as detailed above, base brackets 40 are moved into position. Base brackets 40 are initially disposed in a rotated, installation orientation to facilitate passage of base brackets 40 between beams 20, 30 and into position adjacent base shelves 27, 37 of beams 20, 30, respectively. Once this position has been achieved, base brackets 40 are rotated 90 degrees into a use orientation, wherein feet 42 of base brackets 40 are slidably engaged with base shelves 27, 37 and wherein cable receptacles 44 of base brackets 40 are oriented in an upwardly-facing vertical position.

Figure 7:
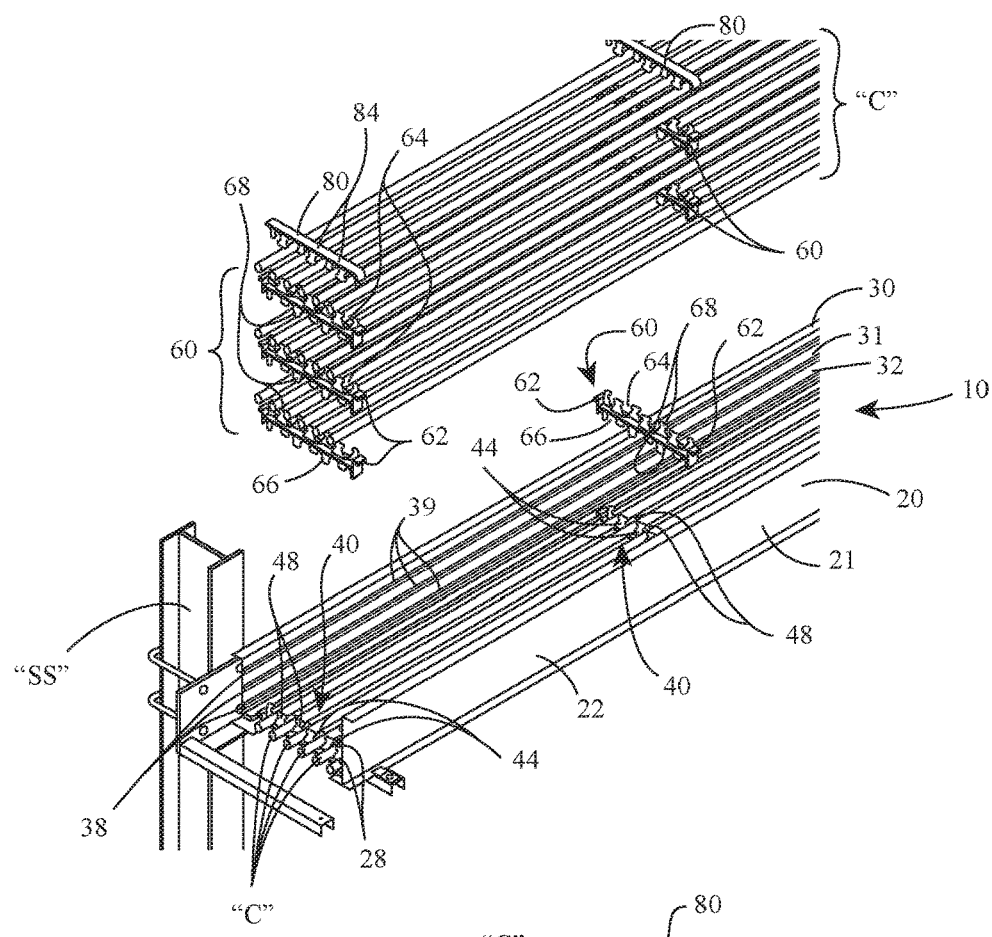
FIG. 7 is an exploded, perspective view of the portion of the cable management system of FIG. 1, illustrating a first row of cables supported on the first and second base brackets of the cable management system.

Turning to FIG. 7, with base brackets 40 in position, a plurality of cables "C" are engaged within cable receptacles 44 of base brackets 40 to form a first row of cables "C." Intermediate brackets 60 are then positioned over the first row of cables "C" such that the lower cable receptacles 66 of intermediate brackets 60 engage the cables "C" of the first row. These intermediate brackets 60 are also inter-fit with the base brackets 40 and, in embodiments, fixedly engaged therewith, e.g., via snap-fit engagement. Cable receptacles 44 of base brackets 40 and cable receptacles 66 of intermediate brackets 60 are disposed in offset, overlapping orientation so as to surround and provide 360 degree retention to the first row of cables "C" within system 10. Further, feet 62 of intermediate brackets 60 are received within channels 39 of shelves 28, 38 of beams 20, 30 to slidably engage intermediate brackets 60 with beams 20, 30.

Figure 8:
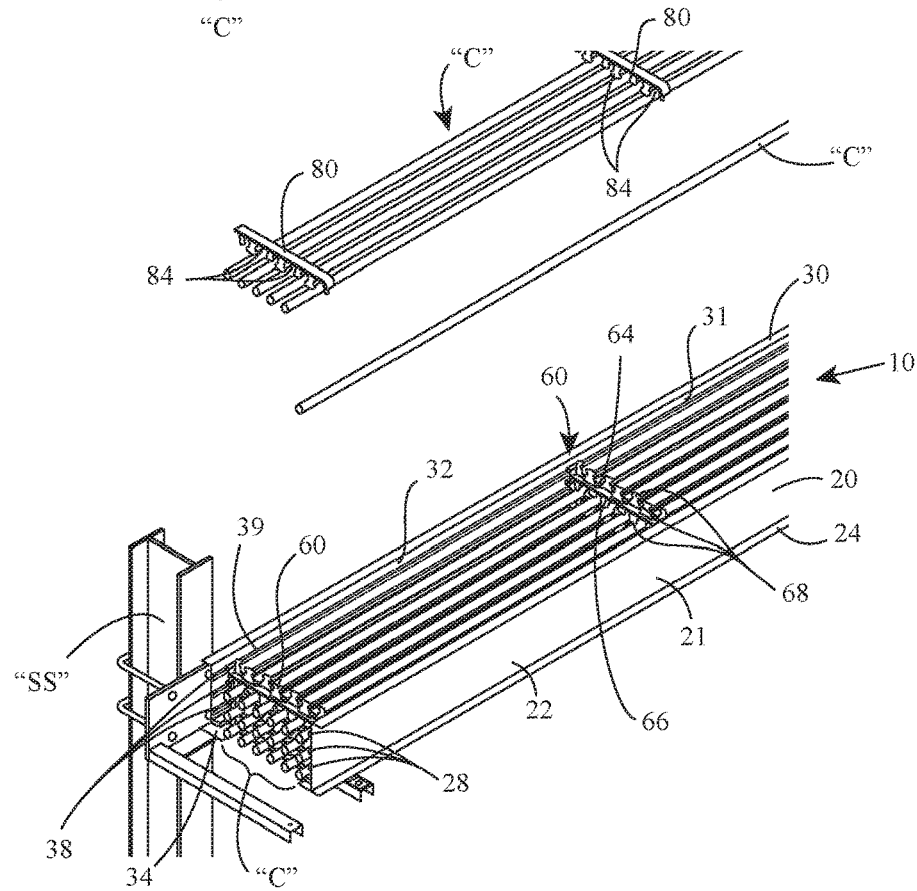
FIG. 8 is an exploded, perspective view of the portion of the cable management system of FIG. 1, illustrating a plurality of rows of cables disposed in a stacked arrangement with first and second intermediate brackets of the cable management system disposed between each row of cables.

Referring also to FIG. 8, with the first set of intermediate brackets 60 in position as detailed above, a plurality of cables "C" are engaged within upper cable receptacles 64 of the first set of intermediate brackets 60 to form a second row of cables "C" stacked on the first row of cables "C." Thereafter, a second set of intermediate brackets 60 is then positioned over the second row of cables "C" such that the lower cable receptacles 66 of the second set of intermediate brackets 60 engage the cables "C" of the second row. These second intermediate brackets 60 are also inter-fit with the first intermediate brackets 60 and, in embodiments, fixedly engaged therewith, e.g., via snap-fit engagement. Upper cable receptacles 64 of the first set of intermediate brackets 60 and lower cable receptacles 66 of the second set of intermediate brackets 60 are disposed in offset, overlapping orientation so as to surround and provide 360 degree retention of the second row of cables "C" within system 10. The feet 62 of intermediate brackets 60 are received within channels 39 of shelves 28, 38 of beams 20, 30 to slidably engage each of the intermediate brackets 60 with beams 20, 30. The above may be repeated with a plurality of additional sets of intermediate bracket 60 and rows of cables "C" alternatingly stacked on one another.

Figure 9:
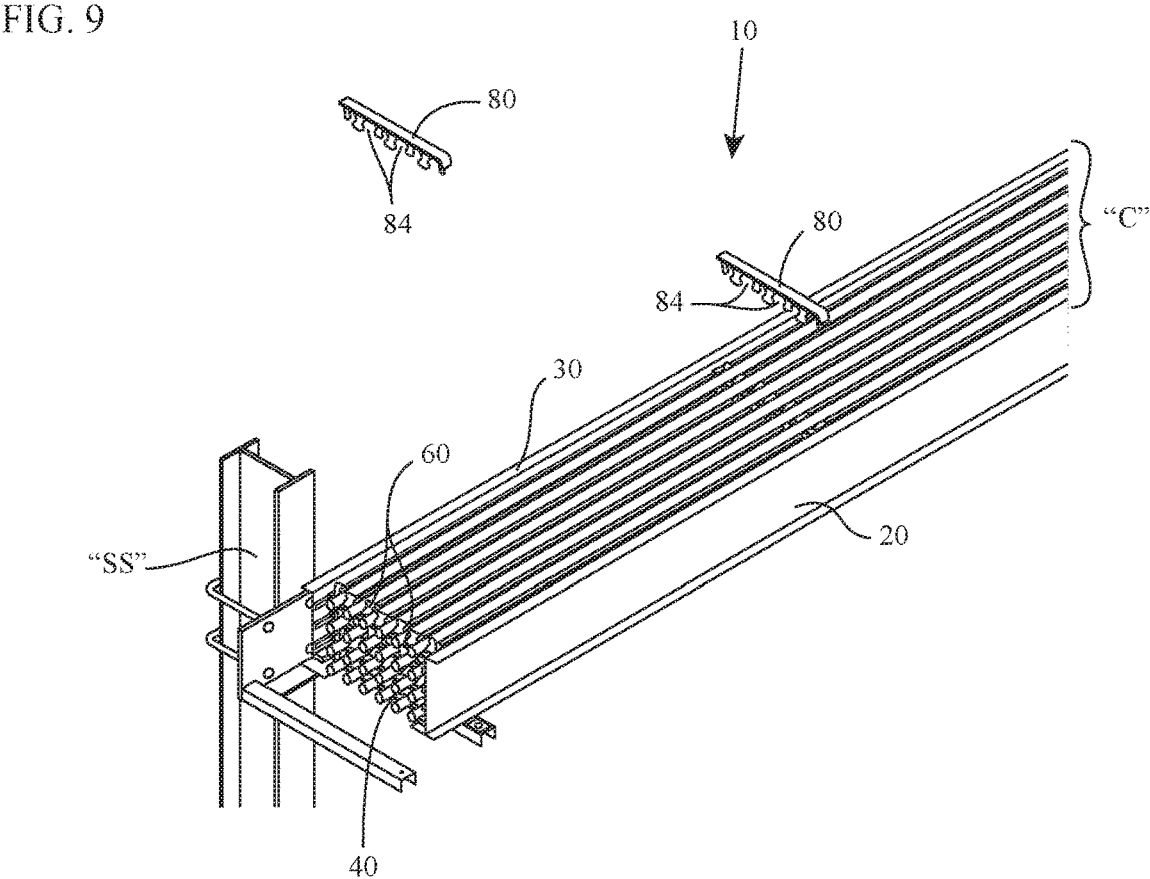
FIGS. 9 and 10 are exploded, perspective views of the portion of the cable management system of FIG. 1, illustrating positioning of first and second cap brackets of the cable management system atop the upper-most row of cables to secure the plurality of rows of cables within the cable management system.
Figure 10:
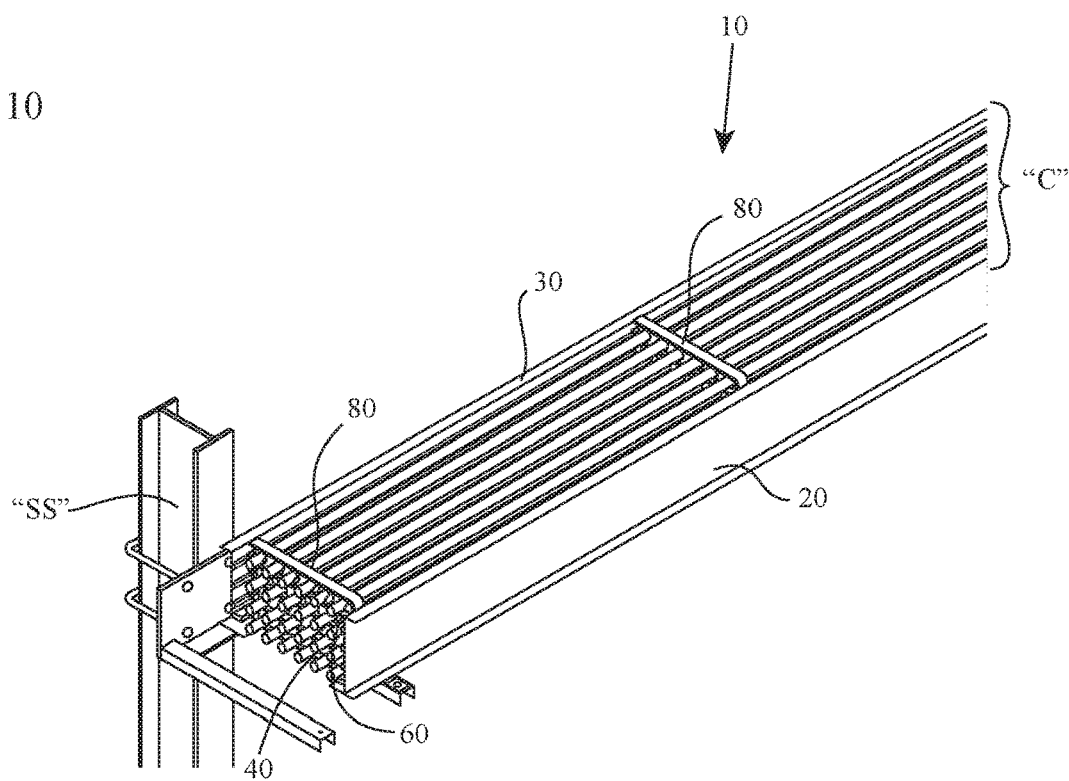

With reference to FIGS. 9 and 10, after the upper-most row of cables "C" is engaged with the upper cable receptacles 64 of the upper-most set of intermediate brackets 60, cap brackets 80 are positioned over the upper-most row of cables "C" such that the cable receptacles 84 of cap brackets 80 engage the cables "C" of the upper-most row, while the cap brackets 60 are also inter-fit with the upper-most intermediate brackets 60 and, in embodiments, fixedly engaged therewith, e.g., via snap-fit engagement. As illustrated in FIG. 10, system 10 provides an easy-to-install, organized, space-efficient configuration for routing cables "C."

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed:

1. A cable management system, comprising:
   first and second beams spaced-apart from one another and extending in generally parallel orientation relative to one another; and
   a first plurality of brackets supported by and extending between the first and second beams in stacked orientation relative to one another, wherein the first plurality of brackets is configured to retain a row of cables between each adjacent pair of stacked brackets, and wherein each bracket of the first plurality of brackets includes a plurality of cable receptacles, and wherein opposing cable receptacles of each adjacent pair of stacked brackets are configured for inter-fit engagement with one another in offset, overlapping orientation to retain a cable of the rows of cables therebetween,
   wherein the first plurality of brackets includes a base bracket, the plurality of cable receptacles of the base bracket disposed on an upwardly-facing side of the base bracket and
   wherein the base bracket defines feet configured to slidably engage shelves of the first and second beams.

2. The cable management system according to claim 1, wherein the first plurality of brackets includes at least one intermediate bracket, the plurality of cable receptacles of the at least one intermediate bracket disposed on both upwardly-facing and downwardly-facing sides of the at least one intermediate bracket.

3. The cable management system according to claim 2, wherein each of the at least one intermediate brackets defines fingers configured to slidably engage shelves of the first and second beams.

4. The cable management system according to claim 1, wherein the first plurality of brackets includes a cap bracket, the plurality of cable receptacles of the cap bracket disposed on a downwardly-facing side of the cap bracket.

5. The cable management system according to claim 1, wherein each cable receptacle includes a pair of sidewalls and defines a U-shaped opening between the sidewalls.

6. The cable management system according to claim 5, wherein the sidewalls include flanges configured to resiliently retain a cable within each U-shaped opening.

7. The cable management system according to claim 1, further comprising:
a second plurality of brackets spaced-apart from the first plurality of brackets along a length of the first and second beams, the second plurality of brackets supported by and extending between the first and second beams in stacked orientation relative to one another, wherein the second plurality of brackets is configured to retain a row of cables between each adjacent pair of stacked brackets, and wherein each bracket of the second plurality of brackets includes a plurality of cable receptacles, and wherein opposing cable receptacles of each adjacent pair of stacked brackets are configured for inter-fit engagement with one another in offset, overlapping orientation to retain a cable of the rows of cables therebetween.

8. A cable management system, comprising:
first and second beams spaced-apart from one another and extending in generally parallel orientation relative to one another;
a base bracket supported by and extending between the first and second beams, the base bracket includes a plurality of cable receptacles disposed on an upwardly-facing side of the base bracket;
a plurality of intermediate brackets supported by and extending between the first and second beams, each intermediate bracket including a plurality of cable receptacles disposed on upwardly-facing and downwardly-facing sides thereof; and
a cap bracket supported by and extending between the first and second beams, the cap bracket includes a plurality of cable receptacles disposed on a downwardly-facing side of the cap bracket,
wherein the base bracket, the plurality of intermediate brackets, and the cap bracket are disposed in stacked relation relative to one another, and wherein opposing cable receptacles of each adjacent pair of stacked brackets are configured for inter-fit engagement with one another in offset, overlapping orientation to retain a cable therebetween such that a row of cables is retained between each adjacent pair of stacked brackets, and
wherein at least one of:
the base bracket defines feet configured to slidably engage shelves of the first and second beams; or
each of the plurality of intermediate brackets defines fingers configured to slidably engage the shelves of the first and second beams.

9. The cable management system according to claim 8, wherein each cable receptacle includes a pair of sidewalls and defines a U-shaped opening between the sidewalls.

10. The cable management system according to claim 9, wherein the sidewalls include flanges configured to resiliently retain a cable within each U-shaped opening.

11. The cable management system according to claim 8, wherein the plurality of intermediate brackets includes a lower intermediate bracket configured to engage the base bracket and another intermediate bracket, at least one middle intermediate bracket configured to engage other intermediate brackets, and an upper intermediate bracket configured to engage another intermediate bracket and the cap bracket.

12. A cable management system, comprising:
first and second beams spaced-apart from one another and extending in generally parallel orientation relative to one another; and
a first plurality of brackets supported by and extending between the first and second beams in stacked orientation relative to one another, wherein the first plurality of brackets is configured to retain a row of cables between each adjacent pair of stacked brackets, and wherein each bracket of the first plurality of brackets includes a plurality of cable receptacles, and wherein opposing cable receptacles of each adjacent pair of stacked brackets are configured for inter-fit engagement with one another in offset, overlapping orientation to retain a cable of the rows of cables therebetween,
wherein the first plurality of brackets includes at least one intermediate bracket, the plurality of cable receptacles of the at least one intermediate bracket disposed on both upwardly-facing and downwardly-facing sides of the at least one intermediate bracket, and
wherein each of the at least one intermediate brackets defines fingers configured to slidably engage shelves of the first and second beams.

13. The cable management system according to claim 12, wherein the first plurality of brackets includes a base bracket, the plurality of cable receptacles of the base bracket disposed on an upwardly-facing side of the base bracket.

14. The cable management system according to claim 13, wherein the base bracket defines feet configured to slidably engage shelves of the first and second beams.

15. The cable management system according to claim 12, wherein the first plurality of brackets includes a cap bracket, the plurality of cable receptacles of the cap bracket disposed on a downwardly-facing side of the cap bracket.

16. The cable management system according to claim 12, wherein each cable receptacle includes a pair of sidewalls and defines a U-shaped opening between the sidewalls.

17. The cable management system according to claim 16, wherein the sidewalls include flanges configured to resiliently retain a cable within each U-shaped opening.

18. The cable management system according to claim 12, further comprising:
a second plurality of brackets spaced-apart from the first plurality of brackets along a length of the first and second beams, the second plurality of brackets supported by and extending between the first and second beams in stacked orientation relative to one another, wherein the second plurality of brackets is configured to retain a row of cables between each adjacent pair of stacked brackets, and wherein each bracket of the second plurality of brackets includes a plurality of cable receptacles, and wherein opposing cable receptacles of each adjacent pair of stacked brackets are configured for inter-fit engagement with one another in offset, overlapping orientation to retain a cable of the rows of cables therebetween.

* * * * *